US011513852B2

(12) United States Patent
Que et al.

(10) Patent No.: US 11,513,852 B2
(45) Date of Patent: Nov. 29, 2022

(54) DATA TRANSFERRING APPARATUS AND METHOD FOR TRANSFERRING DATA WITH OVERLAP

(71) Applicant: GlenFly Technology Co., Ltd., Shanghai (CN)

(72) Inventors: Heng Que, Shanghai (CN); Yuanfeng Wang, Shanghai (CN); Deming Gu, Shanghai (CN); Fengxia Wu, Shanghai (CN)

(73) Assignee: GlenFly Technology Co., Ltd., Shanghai (CN)

( * ) Notice: Subject to any disclaimer, the term of this patent is extended or adjusted under 35 U.S.C. 154(b) by 315 days.

(21) Appl. No.: 16/874,692

(22) Filed: May 15, 2020

(65) Prior Publication Data
US 2021/0271515 A1 Sep. 2, 2021

(30) Foreign Application Priority Data
Feb. 27, 2020 (CN) .......................... 202010122857.6

(51) Int. Cl.
*G06F 9/46* (2006.01)
*G06F 9/50* (2006.01)
*G06F 9/445* (2018.01)

(52) U.S. Cl.
CPC ........ *G06F 9/5005* (2013.01); *G06F 9/44505* (2013.01)

(58) Field of Classification Search
CPC ........................... G06F 9/5005; G06F 9/44505
See application file for complete search history.

(56) References Cited

U.S. PATENT DOCUMENTS

| 8,665,283 B1* | 3/2014 | Lim ....................... G09G 5/393 |
| | | 711/149 |
| 2013/0145076 A1* | 6/2013 | Chiueh ............... G06F 12/0246 |
| | | 711/E12.008 |
| 2014/0351456 A1* | 11/2014 | Sharifie ................. G06F 3/0685 |
| | | 710/5 |

* cited by examiner

*Primary Examiner* — Tammy E Lee
(74) *Attorney, Agent, or Firm* — JCIPRNET (57) ABSTRACT

A data transferring apparatus and a method for transferring data with overlap are provided. The data transferring apparatus includes a command splitter circuit and a plurality of tile processing circuits. The command splitter circuit splits a block level transfer command into a plurality of tile transfer tasks. The command splitter circuit may issue the tile transfer tasks to the tile processing circuits in a plurality of batches. The tile processing circuits may execute the tile transfer tasks in a current batch, so as to read data of a plurality of corresponding tiles among a plurality of source tiles of a source block to the tile processing circuits. After all the tile transfer tasks in the current batch have been executed by the tile processing circuits, the command splitter circuit issues the tile transfer tasks in a next batch of the batches to the tile processing circuits.

18 Claims, 6 Drawing Sheets

DATA TRANSFERRING APPARATUS AND METHOD FOR TRANSFERRING DATA WITH OVERLAP

CROSS-REFERENCE TO RELATED APPLICATION

This application claims the priority benefit of China application serial no. 202010122857.6, filed on Feb. 27, 2020. The entirety of the above-mentioned patent application is hereby incorporated by reference herein and made a part of this specification.

BACKGROUND OF THE INVENTION

1. Field of the Invention

The invention relates to a data processing circuit, and in particular, to a data transferring apparatus and a method for transferring data with overlap.

2. Description of Related Art

In a graphics processing unit (GPU), an artificial intelligence (AI) chip, or other data processing circuits (apparatuses), block level transfer (BLT) is a common memory operation. The BLT indicates that in a virtual address space, all data in a consecutive memory area (a source block) is transferred to another consecutive memory area (a destination block).

Figure 1:
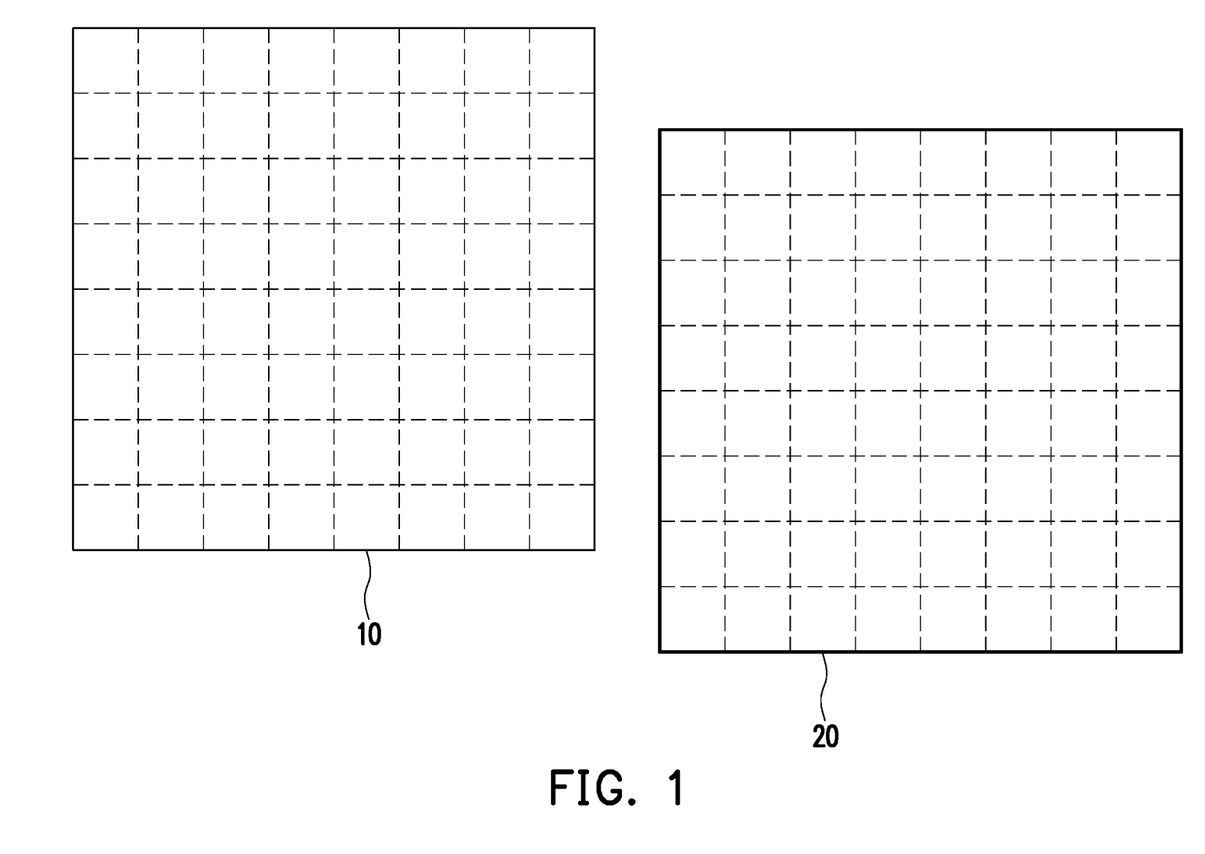
FIG. 1 is a schematic diagram describing a source block and a destination block that do not overlap with each other in a virtual address space.

FIG. 1 is a schematic diagram describing a source block 10 and a destination block 20 that do not overlap with each other in a virtual address space. When implementing the BLT, a data processing circuit usually splits the source block 10 and the destination block 20 into a large quantity of tiles with a fixed size. As shown in FIG. 1, the source block 10 is split into a large quantity of tiles (dashed line blocks), and the quantity of the tiles of the destination block 20 is the same as the quantity of the tiles of the source block 10. Transfer of data is completed based on the tiles. If there is no address space overlap between the source block 10 and the destination block 20, the tiles of the source block 10 may be transferred to the destination block 20 in parallel, and such data transfer in parallel does not cause any disaster of "write after read (WAR)". When copying the data, an execution order of the tiles does not affect a final result. In other words, the execution order of the tiles may be out-of-order.

Figure 2:
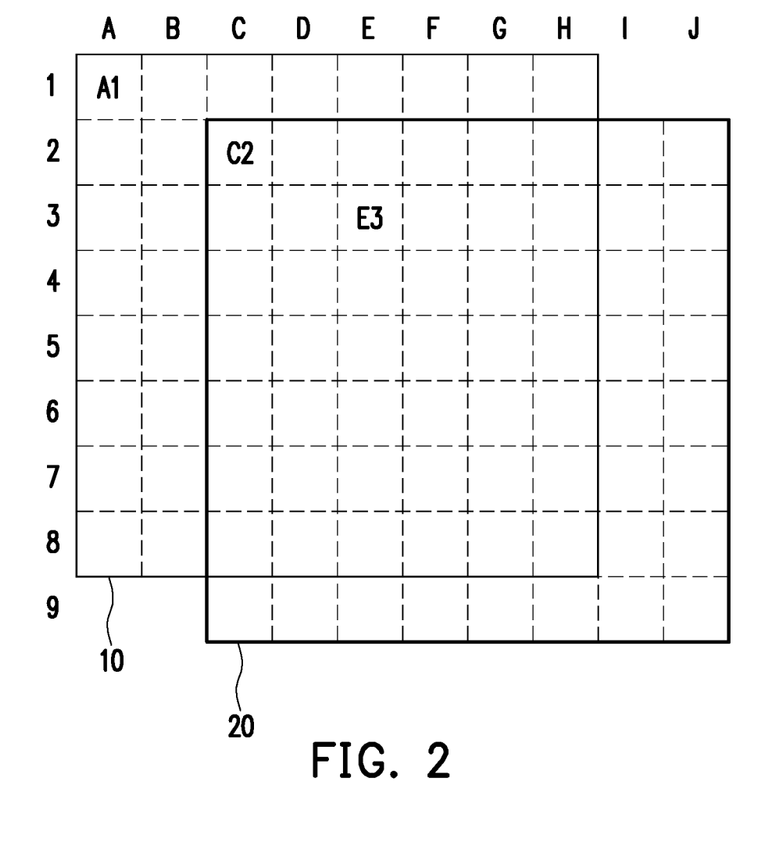
FIG. 2 is a schematic diagram describing a source block and a destination block that overlap with each other in a virtual address space.

FIG. 2 is a schematic diagram describing the source block 10 and the destination block 20 that overlap with each other in the virtual address space. When executing a BLT task on the source block 10 shown in FIG. 2, if performing data transfer on the tiles of the source block 10 in parallel, the disaster of data WAR may occur.

For a situation in which the source block 10 and the destination block 20 overlap with each other shown in FIG. 2, even if only one tile (that is, a dashed line block shown in FIG. 2) is transferred each time, to prevent original data of the source block 10 from being damaged before the original data is read, the data transfer also needs to be performed based on an order of the tiles. By using FIG. 2 as an example, if "transferring from a tile at an address A1 in the source block 10 to a tile at an address C2 in the destination block 20" is first performed, the original data of the tile C2 of the source block 10 is lost. Subsequently, when "transferring from a tile at an address C2 in the source block 10 to a tile at an address E3 in the destination block 20" is performed, data of the tile C2 has actually become data of A1. Consequently, a final result is wrong. However, if "transferring from a tile at an address C2 in the source block 10 to a tile at an address E3 in the destination block 20" is first performed, and then "transferring from a tile at the address A1 in the source block 10 to a tile at the address C2 in the destination block 20" is performed, correctness of the data can be ensured. Therefore, for the example in FIG. 2, a correct order for transferring data is from bottom to top and row by row. A transferring order of tiles in a row does not affect a final result.

However, the data processing circuit (apparatus) usually includes a plurality of hardware processing units (hereinafter referred to as a tile processing unit), to process data transfer of the tiles. If only one tile processing unit is opened (tile transfer is performed in a correct order), mistakes may not occur. However, in this case, other tile processing units are in an idle state, and valuable hardware resources are wasted.

When BLT is performed, in a case that the source block 10 and the destination block 20 overlap with each other, a well-known data processing circuit (apparatus) does not process the tiles in parallel. The well-known data processing circuit (apparatus) enables a tile processing unit to complete data transfer of all the tiles tile by tile. Anyway, BLT execution efficiency of the well-known data processing circuit (apparatus) is excessively low because some hardware resources are in an idle state. In addition, the data transfer manner cannot fully use a high bandwidth of a video memory.

It should be noted that contents in paragraphs of Description of Related Art are used to help to understand the invention. Some contents (or all contents) disclosed in the paragraphs of Description of Related Art do not need to be a technology well known by a person of ordinary skill in the art. The contents disclosed in the paragraphs of Description of Related Art do not mean that the contents have been acknowledged by a person of ordinary skill in the art before the invention is filed.

SUMMARY OF THE INVENTION

The invention provides a data transferring apparatus and a method for transferring data with overlap, to perform data transfer on a plurality of tiles in parallel by using a plurality of tile processing circuits.

The data transferring apparatus in the invention is configured to transfer data with overlap. The data transferring apparatus includes a command splitter circuit and a plurality of tile processing circuits. The command splitter circuit is configured to receive a BLT command. The command splitter circuit may split the BLT command into a plurality of tile transfer tasks, and split the tile transfer tasks into a plurality of batches. The command splitter circuit may issue the tile transfer tasks in a current batch of the batches to the tile processing circuits. The tile processing circuits may execute the tile transfer tasks in the current batch, to read data of a plurality of first corresponding tiles among a plurality of source tiles of a source block to the tile processing circuits (as a plurality of pieces of cache tile data). Only after all the tile transfer tasks in the current batch have been executed by the tile processing circuits, the command splitter circuit issues the tile transfer tasks in a next batch of the batches to the tile processing circuits.

The method for transferring data with overlap in the invention includes: receiving, by a command splitter circuit, a BLT command; splitting, by the command splitter circuit, the BLT command into a plurality of tile transfer tasks, and splitting the tile transfer tasks into a plurality of batches; issuing the tile transfer tasks in a current batch of the batches; executing, by a plurality of tile processing circuits, the tile transfer tasks in the current batch, to read data of a plurality of first corresponding tiles among a plurality of source tiles of a source block to the tile processing circuits (as a plurality of pieces of cache tile data); and only after all the tile transfer tasks in the current batch have been executed by the tile processing circuits, issuing, by the command splitter circuit, the tile transfer tasks in a next batch of the batches to the tile processing circuits.

Based on the above, the command splitter circuit in the embodiments of the invention may split the BLT command into a plurality of tile transfer tasks, and split the tile transfer tasks into a plurality of batches. After the command splitter circuit issues the tile transfer tasks in a batch (the current batch) to the plurality of tile processing circuits, the command splitter circuit pauses issuing the tile transfer tasks. Only after all the data of corresponding tiles of the tile transfer tasks in the current batch has been read to the tile processing circuits, the command splitter circuit issues the tile transfer tasks in another batch (a next batch) to the tile processing circuits. Therefore, the command splitter circuit may perform data transfer on a plurality of tiles in parallel by using the plurality of tile processing circuits.

To make the features and advantages of the invention more comprehensible, detailed descriptions are provided below with reference to the accompanying drawings by using the embodiments.

DESCRIPTION OF THE EMBODIMENTS

The term "coupled to (or connected to)" used throughout this specification (including the claims) of the disclosure may refer to any direct or indirect connection means. For example, if a first apparatus is coupled to (or connected to) a second apparatus in the description of this specification, it should be interpreted as follows: The first apparatus may be directly connected to the second apparatus, or the first apparatus may be indirectly connected to the second apparatus through another apparatus or some connection means. The terms, such as "first" and "second", mentioned throughout this specification (including the claims) of the disclosure are used to name elements or to distinguish between different embodiments or scopes, and are not intended to specify an upper limit or a lower limit of a quantity of the elements, or limit an order of the elements. In addition, wherever possible, elements/components/steps with same reference numbers in the drawings and implementations represent same or similar parts. Elements/components/steps with same reference numbers or described by using same terms in different embodiments may refer to each other for related descriptions.

Figure 3:
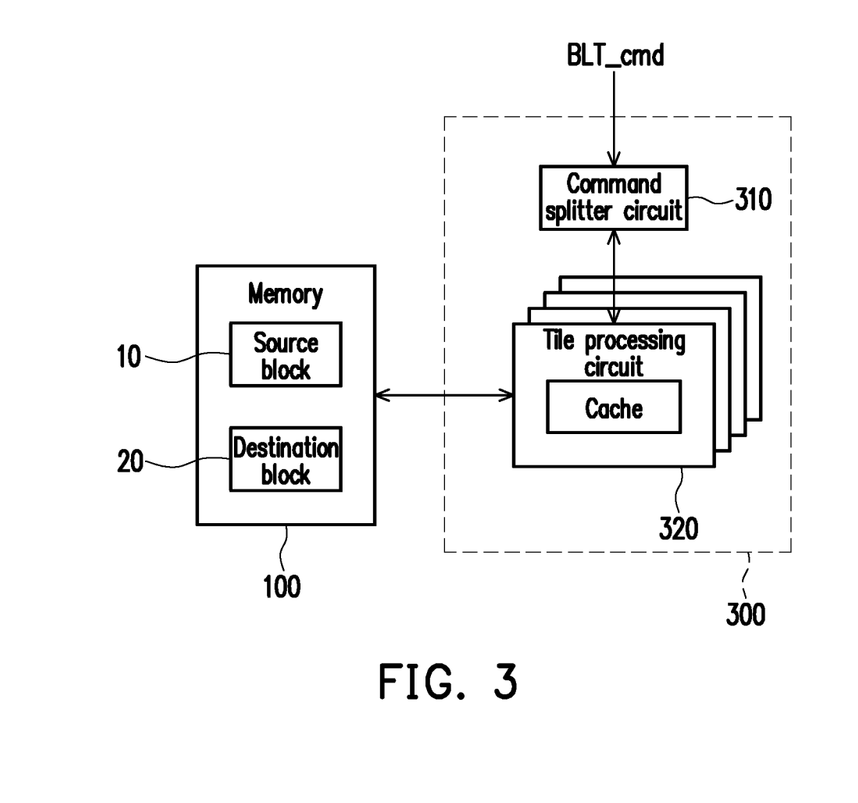
FIG. 3 is a schematic circuit block diagram of a data transferring apparatus according to an embodiment of the invention.

FIG. 3 is a schematic circuit block diagram of a data transferring apparatus 300 according to an embodiment of the invention. The data transferring apparatus 300 may transfer data with overlap. For example, the data transferring apparatus 300 may transfer data of a source block 10 to a destination block 20. The source block 10 and the destination block 20 are stored in a memory 100. When the source block 10 is not overlapped with the destination block 20, related descriptions in FIG. 1 may be referred to. When the source block 10 is partially overlapped with the destination block 20, related descriptions in FIG. 2 may be referred to. In the embodiment shown in FIG. 3, the data transferring apparatus 300 includes a command splitter circuit 310 and a plurality of tile processing circuits 320. A quantity of the tile processing circuits 320 may be determined according to a design requirement.

Figure 4:
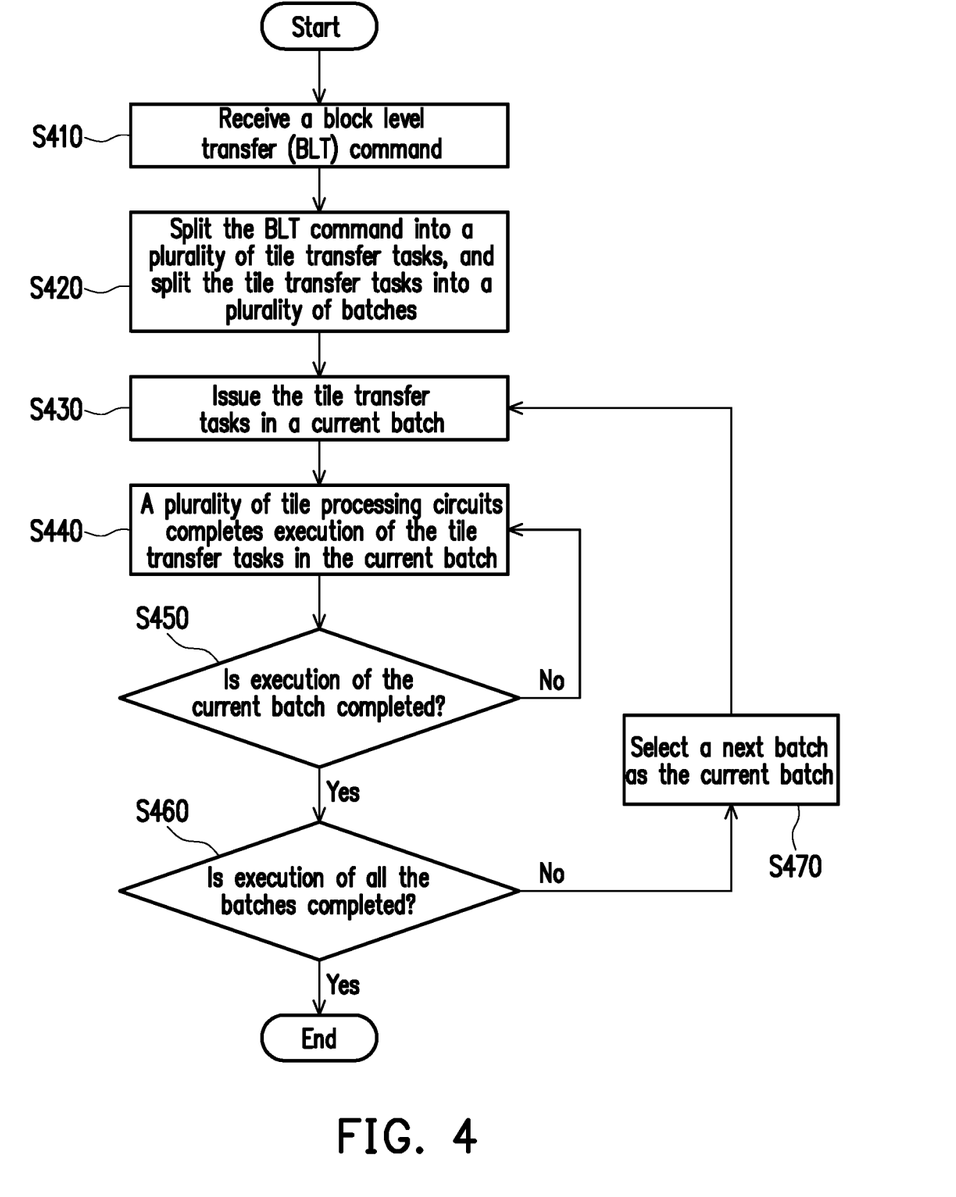
FIG. 4 is a schematic flowchart of a method for transferring data with overlap according to an embodiment of the invention.

FIG. 4 is a schematic flowchart of a method for transferring data with overlap according to an embodiment of the invention. Referring to FIG. 3 and FIG. 4, in step S410, the command splitter circuit 310 may receive a BLT command BLT_cmd. In step S420, the command splitter circuit 310 may split the BLT command BLT_cmd into a plurality of tile transfer tasks, and split the tile transfer tasks into a plurality of batches. The command splitter circuit 310 may select a batch from the batches as a "current batch".

For example, in an address space, when a first row address of the source block 10 is prior to a first row address of the destination block 20, the command splitter circuit 310 may issue the batches in an order of "from a next row to a previous row". Using the source block 10 and the destination block 20 shown in FIG. 2 as an example, because a first row address "1" of the source block 10 is prior to a first row address "2" of the destination block 20, the command splitter circuit 310 may issue the batches in an order of "from a next row to a previous row" (that is, from a row address "8" of the source block 10 to a row address "1" of the source block 10). In some other application situations, when the first row address of the source block 10 is posterior to the first row address of the destination block 20, the command splitter circuit 310 may issue the batches in an order of "from a previous row to a next row".

The tiles (source tiles) of the source block 10 are split into a plurality of source rows in an address space. The tile transfer tasks in each batch (such as the current batch) correspond to at least one row in the source rows. An implementation of "splitting the tile transfer tasks into a plurality of batches" may be determined according to a design requirement and a cache space. For example, in some embodiments, the command splitter circuit 310 may set all the tile transfer tasks in the row address "8" of the source block 10 shown in FIG. 2 as the first batch, and set all the tile transfer tasks in a row address "7" of the source block 10 shown in FIG. 2 as the second batch. By analogy, the command splitter circuit 310 may set all the tile transfer tasks in the row address "1" of the source block 10 shown in FIG. 2 as the eighth batch. In some other embodiments, the command splitter circuit 310 may set all the tile transfer tasks in the row addresses "8" and "7" of the source block 10 shown in FIG. 2 as the first batch, and set all the tile transfer tasks in row addresses "6" and "5" of the source block 10 shown in FIG. 2 as the second batch. By analogy, the command splitter circuit 310 may set all the tile transfer tasks in row addresses "2" and "1" of the source block 10 shown in FIG. 2 as the fourth batch.

Referring to FIG. 3 and FIG. 4, in step S430, the command splitter circuit 310 may issue the tile transfer tasks in the "current batch" to the tile processing circuits 320. Each tile processing circuit 320 has a cache. In step S440, the tile processing circuits 320 may execute the tile transfer tasks in the "current batch" in parallel, to read data of a plurality of first corresponding tiles among a plurality of source tiles of the source block 10 to the tile processing circuits 320 (as a plurality of pieces of cache tile data).

For example, it is assumed that the cache of each tile processing circuit 320 may store data of eight tiles, and a quantity of the tile processing circuits 320 is two. Referring to FIG. 2 and FIG. 3, based on this specified condition, in some embodiments, the first batch may include tile transfer tasks whose source addresses are A8, B8, C8, D8, E8, F8, G8, and H8. The first tile processing circuit 320 may process tile transfer tasks of "transferring from A8 to C9", "transferring from C8 to E9", "transferring from E8 to G9", and "transferring from G8 to I9". The second tile processing circuit 320 may process tile transfer tasks of "transferring from B8 to D9", "transferring from D8 to F9", "transferring from F8 to H9", and "transferring from H8 to J9". Therefore, the tile processing circuits 320 may execute the tile transfer tasks of the first batch in parallel, and read data of a plurality of corresponding tiles A8, B8, C8, D8, E8, F8, G8, and H8 of the source block 10 to caches of the tile processing circuits 320. The remaining batches may be deduced with reference to the first batch. Therefore, details are not described again.

For another example, it is assumed that the cache of each tile processing circuit 320 may store data of sixteen tiles, and a quantity of the tile processing circuits 320 is two. Referring to FIG. 2 and FIG. 3, based on this set condition, in some embodiments, the first batch may include tile transfer tasks whose source addresses are A8, B8, C8, D8, E8, F8, G8, H8, A7, B7, C7, D7, E7, F7, G7, and H7. The first tile processing circuit 320 may process tile transfer tasks of "transferring from A8 to C9", "transferring from C8 to E9", "transferring from E8 to G9", "transferring from G8 to I9", "transferring from B7 to D8", "transferring from D7 to F8", "transferring from F7 to H8", and "transferring from H7 to J8". The second tile processing circuit 320 may process tile transfer tasks of "transferring from B8 to D9", "transferring from D8 to F9", "transferring from F8 to H9", "transferring from H8 to J9", "transferring from A7 to C8", "transferring from C7 to E8", "transferring from E7 to G8", and "transferring from G7 to I8". Therefore, the tile processing circuits 320 may execute the tile transfer tasks of the first batch in parallel, and read data of a plurality of corresponding tiles A8, B8, C8, D8, E8, F8, G8, H8, A7, B7, C7, D7, E7, F7, G7, and H7 of the source block 10 to caches of the tile processing circuits 320. The remaining batches may be deduced with reference to the first batch. Therefore, details are not described again.

Referring to FIG. 3 and FIG. 4, after the command splitter circuit 310 issues the tile transfer tasks in a batch (the current batch) to the tile processing circuits 320, the command splitter circuit 310 pauses issuing the tile transfer tasks to the tile processing circuits 320. When there are tasks that are in the tile transfer tasks in the current batch and that are not yet executed (that is, data of the source tiles in the current batch is not completely read to the caches of the tile processing circuits 320) (that is, a determining result of step S450 is "No"), step S440 may be continued.

After all data of the source tiles corresponding to the tile transfer tasks in the current batch has been read to the caches of the tile processing circuits 320 (that is, a determining result of step S450 is "Yes"), the data transferring apparatus 300 may perform step S460. In step S460, the data transferring apparatus 300 may determine whether there is any batch that is not yet issued to the tile processing circuits 320. When there are batches that are not yet issued to the tile processing circuits 320 (that is, a determining result of step S460 is "No"), the data transferring apparatus 300 may perform step S470. In step S470, the command splitter circuit 310 may select a new batch (a next batch) as the "current batch".

After step S470, the command splitter circuit 310 may perform step S430 again. When the tile transfer tasks in the new batch are issued to the tile processing circuits 320, the tile processing circuits 320 may write cache tile data in the caches to a destination block 20 in the memory 100. Then the tile processing circuits 320 may execute the tile transfer tasks in the new batch in parallel, to read data of a plurality of second corresponding tiles of the source block 10 to the caches of the tile processing circuits 320. When an address of the source block 10 is prior to an address of the destination block 20, an address of the tile transfer tasks in the current batch is posterior to an address of the tile transfer tasks in the next batch. When an address of the source block 10 is posterior to an address of the destination block 20, an address of the tile transfer tasks in the current batch is prior to an address of the tile transfer tasks in the next batch.

For example, it is assumed that the first batch may include tile transfer tasks whose source addresses are A8, B8, C8, D8, E8, F8, G8, H8, A7, B7, C7, D7, E7, F7, G7, and H7, and the second batch may include tile transfer tasks whose source addresses are A6, B6, C6, D6, E6, F6, G6, H6, A5, B5, C5, D5, E5, F5, G5, and H5. After all the tile transfer tasks in the first batch have been completed, the command splitter circuit 310 may select the second batch. When the tile transfer tasks in the second batch are issued to the tile processing circuits 320, the tile processing circuits 320 may write the cache tile data in the caches (that is, original data whose source addresses are A8, B8, C8, D8, E8, F8, G8, H8, A7, B7, C7, D7, E7, F7, G7, and H7) to destination addresses C9, D9, E9, F9, G9, H9, I9, J9, C8, D8, E8, F8, G8, H8, I8, and J8 of the destination block 20 in the memory 100. Then, the tile processing circuits 320 may execute the tile transfer tasks in the second batch in parallel, and read data of source addresses A6, B6, C6, D6, E6, F6, G6, H6, A5, B5, C5, D5, E5, F5, G5, and H5 of the source block 10 to the caches of the tile processing circuits 320.

After step S470, the command splitter circuit 310 may perform step S430, S440, and S450 again, until all the batches have been executed (that is, a determining result of step S460 is "Yes"). Therefore, after the command splitter circuit 310 issues the tile transfer tasks in a batch (the current batch) to the tile processing circuits 320, the command splitter circuit 310 pauses issuing the tile transfer tasks to the tile processing circuits 320. Only after all the tile transfer tasks in the current batch have been executed by the tile processing circuits 320, the command splitter circuit 310 may issue the tile transfer tasks in the next batch to the tile processing circuits 320. The command splitter circuit 310 may perform synchronous data transfer on a plurality of tiles in parallel by using the plurality of tile processing circuits 320. Therefore, the data transferring apparatus 300 does not cause any disaster of "WAR".

Figure 5:
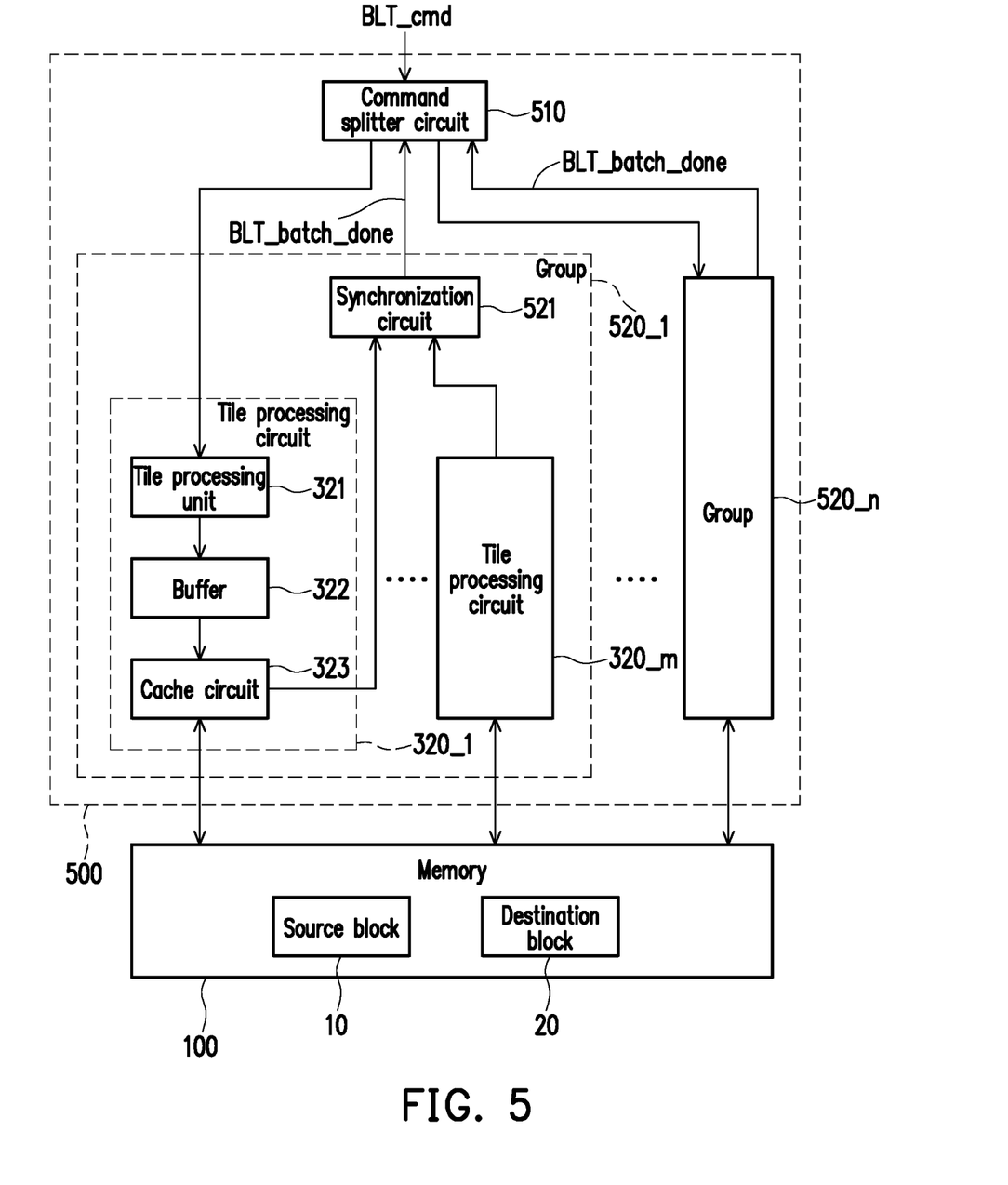
FIG. 5 is a schematic circuit block diagram of a data transferring apparatus according to another embodiment of the invention.

FIG. 5 is a schematic circuit block diagram of a data transferring apparatus 500 according to another embodiment of the invention. In the embodiment shown in FIG. 5, the data transferring apparatus 500 includes a command splitter circuit 510 and a plurality of groups 520_1 to 520_n. A quantity n of the groups may be determined according to a design requirement. A source block 10, a destination block 20, a memory 100, the data transferring apparatus 500, and a command splitter circuit 510 shown in FIG. 5 may be deduced with reference to the related descriptions of the source block 10, the destination block 20, the memory 100, the data transferring apparatus 300, and the command splitter circuit 310 shown in FIG. 3.

Circuit architectures of the groups 520_1 to 520_n may be the same as each other. The group 520_1 are used as an example for description below, and the remaining groups may be deduced with reference to the related descriptions of the group 520_1. In the embodiment shown in FIG. 5, the group 520_1 includes a synchronization circuit 521 and at least one tile processing circuit. FIG. 5 shows m tile processing circuits 320_1 to 320_m, and a quantity m of the tile processing circuits may be determined according to a design requirement. The tile processing circuits 320_1 to 320_m shown in FIG. 5 may be deduced with reference to the related descriptions of the tile processing circuits 320 shown in FIG. 3. After the command splitter circuit 510 receives a BLT command BLT_cmd, the command splitter circuit 510 may split the BLT command BLT_cmd into a plurality of batches of tile transfer tasks. The command splitter circuit 510 may issue the tile transfer tasks in a "current batch" to the tile processing circuits 320_1 to 320_m of the groups 520_1 to 520_n. The tile processing circuits 320_1 to 320_m of the groups 520_1 to 520_n may execute the tile transfer tasks in the "current batch" in parallel, to read data of a plurality of corresponding tiles among a plurality of the source block 10 to caches of the tile processing circuits 320_1 to 320_m.

The synchronization circuit 521 is coupled to the tile processing circuits 320_1 to 320_m belonging to the group 520_1. After all the tile processing circuits 320_1 to 320_m belonging to the group 520_1 have completed the corresponding tile transfer tasks in the current batch, the synchronization circuit 521 feeds back a batch completion signal BLT_batch_done to the command splitter circuit 510. When all synchronization circuits 521 in the groups 520_1 to 520_n feed back the batch completion signal BLT_batch_done to the command splitter circuit 510, the command splitter circuit 510 issues the tile transfer tasks in a next batch to the tile processing circuits.

Circuit architectures of the tile processing circuits 320_1 to 320_m may be the same as each other. The tile processing circuit 320_1 is used as an example for description below, and the remaining tile processing circuits may be deduced with reference to the related descriptions of the tile processing circuit 320_1. In the embodiment shown in FIG. 5, the tile processing circuit 320_1 includes a tile processing unit 321, a buffer 322, and a cache circuit 323. The tile processing unit 321 is coupled to the command splitter circuit 510 to receive the plurality of corresponding tile transfer tasks in the current batch. The tile processing unit 321 may issue a plurality of tile configuration requests to the buffer 322 based on the plurality of the corresponding tile transfer tasks in the current batch. According to a design requirement, the buffer 322 may be a first-in-first-out (FIFO) memory or a memory of another type.

Figure 6:
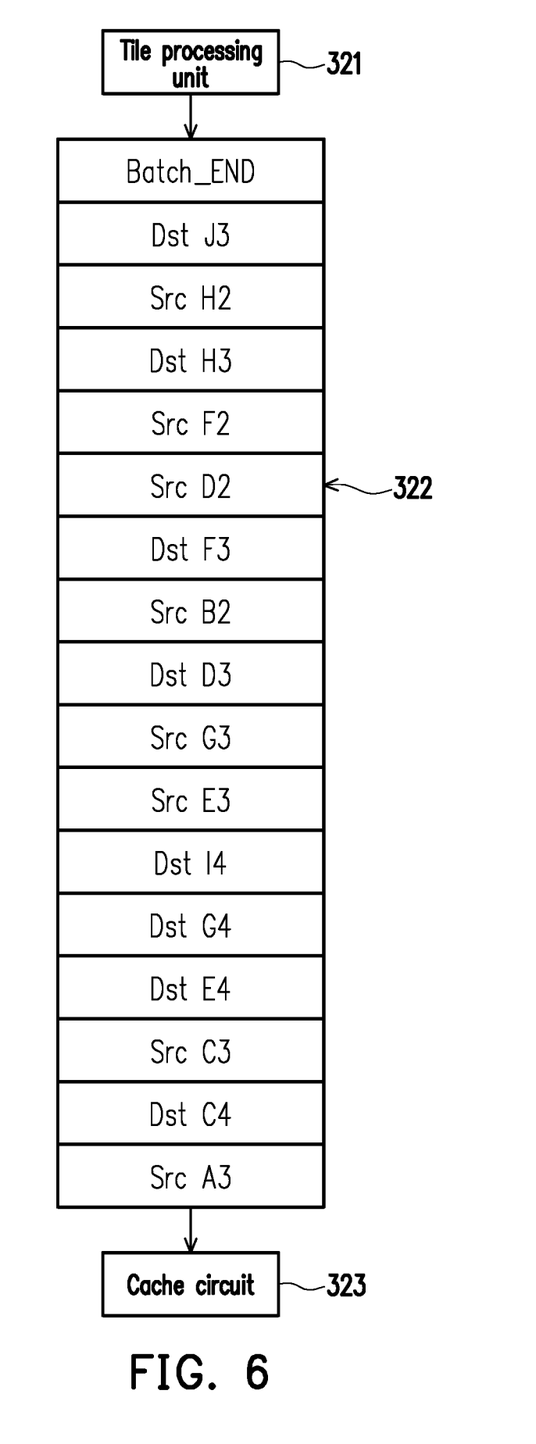
FIG. 6 is a schematic content diagram describing a buffer shown in FIG. 5 according to an embodiment of the invention.

FIG. 6 is a schematic content diagram describing a buffer 322 shown in FIG. 5 according to an embodiment of the invention. Referring to FIG. 2, FIG. 5, and FIG. 6, it is assumed that a cache circuit 323 of a tile processing circuit 320_1 may store data of sixteen tiles, and a data transferring apparatus 500 includes two tile processing circuits. Based on this specified condition, a batch (a current batch) may include tile transfer tasks whose source addresses are A2, B2, C2, D2, E2, F2, G2, H2, A3, B3, C3, D3, E3, F3, G3, and H3. The tile processing circuit 320_1 may process tile transfer tasks of "transferring from A3 to C4", "transferring from C3 to E4", "transferring from E3 to G4", "transferring from G3 to I4", "transferring from B2 to D3", "transferring from D2 to F3", "transferring from F2 to H3", and "transferring from H2 to J3". As shown in FIG. 6, the tile processing unit 321 may split the tile transfer tasks into a plurality of tile configuration requests to the buffer 322. In the embodiment shown in FIG. 6, "Src" represents a source tile configuration request, and "Dst" represents a destination tile configuration request.

The cache circuit 323 is coupled to the buffer 322, to obtain tile configuration requests. The cache circuit 323 may execute the tile configuration requests, to read data of a plurality of corresponding tiles in a source block 10 to the cache circuit 323. For example, when the cache circuit 323 executes a tile configuration request "Src A3", the cache circuit 323 may configure a source tile space in a cache, and reset a flag of the source tile space to "0". After the source tile space is configured, the cache circuit 323 may read, according to the tile configuration request "Src A3", tile data of the source address A3 of the source block 10 (shown in FIG. 2) in a memory 100 to the source tile space in the cache for storing. After the tile data of the source address A3 in the memory 100 is read to the source tile space for storing, the cache circuit 323 may set the flag of the source tile space to "1", to indicate that the tile configuration request "Src A3" has been completed.

When the cache circuit 323 executes a tile configuration request "Dst C4", the cache circuit 323 may configure a destination tile space in the cache, but do not read data from the memory 100. After the destination tile space is configured, the cache circuit 323 may reset a flag of the destination tile space to "0". After the destination tile space is configured, the cache circuit 323 may write cache data of the tile configuration request "Src A3" to the destination tile space in the cache. After the data is written to the destination tile space, the cache circuit 323 may set the flag of the destination tile space to "1", to indicate that the tile configuration request "Dst C4" has been completed.

At the end of issuing of the tile configuration requests for each batch, the tile processing unit 321 may insert a token "Batch END" (as shown in FIG. 6) at the end of the tile configuration requests for a batch, indicating an end of a batch. When the cache circuit 323 obtains the token "Batch END" from the buffer 322, the cache circuit 323 may check whether the tile configuration requests "Src" in the batch are completed. That is, the cache circuit 323 may check whether all flags of all source tile spaces in the cache are "1". Once all the flags of all the source tile spaces in the cache are "1", the cache circuit 323 may notify a synchronization circuit 521, indicating that the cache circuit 323 can work for a next batch. After all tile processing circuits 320_1 to 320_m in a group 520_1 notify the synchronization circuit 521, the synchronization circuit 521 may feed back a batch completion signal BLT_batch_done to a command splitter circuit 510.

When all synchronization circuits 521 in the groups 520_1 to 520_n feed back the batch completion signal BLT_batch_done to the command splitter circuit 510, the command splitter circuit 510 issues the tile transfer tasks in a next batch to the tile processing circuits. When the tile transfer tasks in the next batch are issued to the tile processing circuits 320_1 to 320_m of the groups 520_1 to 520_n, the cache circuit 323 may write the data back to a destination block 20. Then the cache circuit 323 executes tile configuration requests corresponding to the next batch.

According to different design requirements, an implementation of blocks of the data transferring apparatus, the command splitter circuit, the tile processing circuit, the synchronization circuit, the tile processing unit, and (or) the cache circuit may be hardware, firmware, software (that is, programs), or a combined form of two or three of the foregoing.

For a hardware form, the blocks of the data transferring apparatus, the command splitter circuit, the tile processing circuit, the synchronization circuit, the tile processing unit, and (or) the cache circuit may be implemented on a logic circuit of an integrated circuit. Related functions of the data transferring apparatus, the command splitter circuit, the tile processing circuit, the synchronization circuit, the tile processing unit, and (or) the cache circuit may be implemented as hardware by using a hardware description language (such as a Verilog HDL or a VHDL) or other suitable programming languages. For example, the related functions of the data transferring apparatus, the command splitter circuit, the tile processing circuit, the synchronization circuit, the tile processing unit, and (or) the cache circuit may be implemented in one or more controllers, micro controllers, microprocessors, application-specific integrated circuits (ASICs), digital signal processors (DSPs), field programmable gate arrays (FPGAs), and/or various logic blocks, modules, and circuits in other processing units.

For software and/or firmware forms, the related functions of the data transferring apparatus, the command splitter circuit, the tile processing circuit, the synchronization circuit, the tile processing unit, and (or) the cache circuit may be implemented as programming codes. For example, the data transferring apparatus, the command splitter circuit, the tile processing circuit, the synchronization circuit, the tile processing unit, and (or) the cache circuit may be implemented by using general programming languages (such as C, C++, or other combinations of languages), or other suitable programming languages. The programming codes may be recorded/stored in a recording medium. The recording medium, for example, includes a read-only memory (ROM), a storage device, and/or a random access memory (RAM). A computer, a central processing unit (CPU), a controller, a micro controller, or a microprocessor may read the programming codes from the recording medium and execute the programming codes, thereby achieving related functions. For the recording medium, a "non-transitory computer readable medium" may be used. For example, a tape, a disk, a card, a semiconductor memory, a programmable logic circuit may be used. In addition, the program may be provided to the computer (or the CPU) by using any transmission medium (such as a communications network or broadcast wave). The communications network may be, for example, the Internet, wired communication, wireless communication, or other communications mediums.

Based on the above, the command splitter circuit in the embodiments of the invention may split the tile transfer tasks into a plurality of batches. After the command splitter circuit issues the tile transfer tasks in a batch (the current batch) to the plurality of tile processing circuits, the command splitter circuit pauses issuing the tile transfer tasks, until all the tile transfer tasks in the current batch have been completed. Only after all the data of corresponding tiles of the tile transfer tasks in the current batch has been read to the tile processing circuits, the command splitter circuit issues the tile transfer tasks in another batch (a next batch) to the tile processing circuits. Therefore, the command splitter circuit may perform data transfer on a plurality of tiles in parallel by using the plurality of tile processing circuits.

Although the invention has been disclosed as above by using the embodiments, the embodiments are not intended to limit the invention. Any person of ordinary skill in the art can make some changes and modifications without departing from the spirit and scope of the invention. Therefore, the protection scope of the invention should be subject to the appended claims.

What is claimed is:

1. A data transferring apparatus, configured to transfer data with overlap, comprising:
   a command splitter circuit, configured to receive a block level transfer command, split the block level transfer command into a plurality of tile transfer tasks, split the tile transfer tasks into a plurality of batches, and issue the tile transfer tasks in a current batch of the batches; and
   a plurality of tile processing circuits, configured to execute the tile transfer tasks in the current batch, so as to read data of a plurality of first corresponding tiles among a plurality of source tiles of a source block to the tile processing circuits as a plurality of cache tile data, wherein after the tile transfer tasks in the current batch have been executed by the tile processing circuits, the command splitter circuit issues the tile transfer tasks in a next batch of the batches to the tile processing circuits;
   wherein the tile processing circuits are split into a plurality of groups and each of the groups further comprises:
   a synchronization circuit, coupled to the tile processing circuits belonging to the group, wherein after the tile processing circuits belonging to the group have completed corresponding tile transfer tasks in the current batch, the synchronization circuit feeds back a batch completion signal to the command splitter circuit, wherein
   only when all synchronization circuits in the groups feed back the batch completion signal to the command splitter circuit, the command splitter circuit issues the tile transfer tasks in the next batch to the tile processing circuits.

2. The data transferring apparatus according to claim 1, wherein when the tile transfer tasks in the next batch are issued to the tile processing circuits, the tile processing circuits write the cache tile data to a destination block, and then the tile processing circuits execute the tile transfer tasks in the next batch, so as to read data of a plurality of second corresponding tiles of the source block to the tile processing circuits.

3. The data transferring apparatus according to claim 2, wherein the source block is partially overlapped with the destination block.

4. The data transferring apparatus according to claim 2, wherein the source block and the destination block are stored in a memory.

5. The data transferring apparatus according to claim 2, wherein
   when an address of the source block is prior to an address of the destination block, an address of the tile transfer tasks in the current batch is posterior to an address of the tile transfer tasks in the next batch; and when the address of the source block is posterior to the address of the destination block, the address of the tile transfer tasks in the current batch is prior to the address of the tile transfer tasks in the next batch.

6. The data transferring apparatus according to claim 2, wherein in an address space, when a first row address of the source block is prior to a first row address of the destination block, the command splitter circuit issues the batches in an order of "from a next row to a previous row"; and in the address space, when the first row address of the source block is posterior to the first row address of the destination block, the command splitter circuit issues the batches in an order of "from a previous row to a next row".

7. The data transferring apparatus according to claim 1, wherein the source tiles are split into a plurality of source rows in an address space and the tile transfer tasks in the current batch correspond to at least one row in the source rows.

8. The data transferring apparatus according to claim 1, wherein each of the tile processing circuits comprises:

a buffer;

a tile processing unit, coupled to the command splitter circuit to receive a plurality of corresponding tile transfer tasks in the current batch and configured to issue a plurality of tile configuration requests to the buffer based on the corresponding tile transfer tasks; and a cache circuit, coupled to the buffer and configured to execute the tile configuration requests, so as to read data of a plurality of corresponding tiles in the source block to the cache circuit.

9. The data transferring apparatus according to claim 8, wherein when the tile transfer tasks in the next batch are issued to the tile processing circuits, the cache circuit writes data to a destination block, and then the cache circuit executes the tile configuration requests corresponding to the next batch.

10. A method for transferring data with overlap, comprising:

receiving, by a command splitter circuit, a block level transfer command;

splitting, by the command splitter circuit, the block level transfer command into a plurality of tile transfer tasks, and splitting the tile transfer tasks into a plurality of batches;

issuing the tile transfer tasks in a current batch of the batches;

executing, by a plurality of tile processing circuits, the tile transfer tasks in the current batch, so as to read data of a plurality of first corresponding tiles among a plurality of source tiles of a source block to the tile processing circuits as a plurality of cache tile data; and issuing, by the command splitter circuit, the tile transfer tasks in a next batch of the batches to the tile processing circuits after the tile transfer tasks in the current batch have been executed by the tile processing circuits;

wherein the plurality of tile processing circuits are split into a plurality of groups and each of the groups further comprises:

a synchronization circuit, coupled to the tile processing circuits belonging to the group, wherein after the tile processing circuits belonging to the group have completed corresponding tile transfer tasks in the current batch, the synchronization circuit feeds back a batch completion signal to the command splitter circuit, wherein only when all synchronization circuits in the groups feed back the batch completion signal to the command splitter circuit, the command splitter circuit issues the tile transfer tasks in the next batch to the tile processing circuits.

11. The method for transferring data according to claim 10, further comprising:

writing the cache tile data to a destination block when the tile transfer tasks in the next batch are issued to the tile processing circuits, and then executing the tile transfer tasks in the next batch, so as to read data of a plurality of second corresponding tiles of the source block to the tile processing circuits.

12. The method for transferring data according to claim 11, wherein the source block is partially overlapped with the destination block.

13. The method for transferring data according to claim 11, wherein the source block and the destination block are stored in a memory.

14. The method for transferring data according to claim 11, wherein when an address of the source block is prior to an address of the destination block, an address of the tile transfer tasks in the current batch is posterior to an address of the tile transfer tasks in the next batch; and when the address of the source block is posterior to the address of the destination block, the address of the tile transfer tasks in the current batch is prior to the address of the tile transfer tasks in the next batch.

15. The method for transferring data according to claim 11, further comprising:

issuing the batches in an order of "from a next row to a previous row" in an address space when a first row address of the source block is prior to a first row address of the destination block; and issuing the batches in an order of "from a previous row to a next row" in the address space when the first row address of the source block is posterior to the first row address of the destination block.

16. The method for transferring data according to claim 10, wherein the source tiles are split into a plurality of source rows in an address space and the tile transfer tasks in the current batch correspond to at least one row in the source rows.

17. The method for transferring data according to claim 10, further comprising:

issuing, by a tile processing unit, a plurality of tile configuration requests to a buffer based on a plurality of corresponding tile transfer tasks in the current batch; and executing, by a cache circuit, the tile configuration requests of the buffer, so as to read data of a plurality of corresponding tiles in the source block to the cache circuit.

18. The method for transferring data according to claim 17, further comprising:

writing, by the cache circuit, data to a destination block when the tile transfer tasks in the next batch are issued to the tile processing circuits, and then executing the tile configuration requests corresponding to the next batch.

* * * * *